(12) United States Patent
Uhlir-Tsang et al.

(10) Patent No.: US 8,177,346 B2
(45) Date of Patent: May 15, 2012

(54) ADDITIVES TO ELIMINATE BRONZING OF INK-JET INKS PRINTED ON PHOTO MEDIA

(75) Inventors: Linda C. Uhlir-Tsang, Corvallis, OR (US); John R. Moffatt, Corvallis, OR (US); Mary E. Austin, Corvallis, OR (US); LeAnn Marie Bell, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2048 days.

(21) Appl. No.: 11/058,697

(22) Filed: Feb. 14, 2005

(65) Prior Publication Data
US 2005/0142306 A1   Jun. 30, 2005

Related U.S. Application Data

(63) Continuation-in-part of application No. 10/400,131, filed on Mar. 25, 2003, now Pat. No. 7,052,537.

(60) Provisional application No. 60/609,402, filed on Sep. 13, 2004.

(51) Int. Cl.
*B41J 2/01* (2006.01)
(52) U.S. Cl. ............ 347/100; 106/31.13; 428/32.1
(58) Field of Classification Search .......... 428/32.1; 523/160, 161; 347/1, 100; 106/31.13
See application file for complete search history.

(56) References Cited

U.S. PATENT DOCUMENTS

| | | | |
|---|---|---|---|
| 5,062,893 A | | 11/1991 | Adamic et al. |
| 5,275,867 A | | 1/1994 | Misuda et al. |
| 5,463,178 A | | 10/1995 | Suzuki et al. |
| 5,605,750 A | | 2/1997 | Romano et al. |
| 5,942,335 A | * | 8/1999 | Chen et al. ........... 428/32.38 |
| 5,989,378 A | | 11/1999 | Liu et al. |
| 6,100,315 A | * | 8/2000 | Kitamura et al. ......... 523/160 |
| 6,149,722 A | | 11/2000 | Robertson et al. |
| 6,187,430 B1 | | 2/2001 | Mukoyoshi et al. |
| 6,319,309 B1 | * | 11/2001 | Lavery et al. ........... 106/31.27 |
| 2004/0003755 A1 | | 1/2004 | Fukumoto et al. |
| 2004/0085421 A1 | * | 5/2004 | Oki et al. ............... 347/100 |

FOREIGN PATENT DOCUMENTS

| | | |
|---|---|---|
| EP | 0 463 737 A | 1/1992 |
| EP | 0 675 178 A | 10/1995 |
| EP | 1 462 488 A | 9/2004 |
| EP | 1 514 913 A | 3/2005 |
| WO | WO 2005/012447 A | 2/2005 |

OTHER PUBLICATIONS

STN search history for compounds in application specification. Imported as STN.pdf.*

* cited by examiner

*Primary Examiner* — Gerard Higgins

(57) ABSTRACT

Anti-bronzing agents are added to ink-jet inks to prevent bronzing of the inks when printed on various types of photographic media. The additive can include one or more anti-bronzing agents comprising certain planar aliphatic or planar aromatic ring structures. The planar ring-containing anti-bronzing agent can be present in an effective concentration to reduce bronzing of the ink-jet ink printed on the ink-receiving layer.

12 Claims, No Drawings

ADDITIVES TO ELIMINATE BRONZING OF INK-JET INKS PRINTED ON PHOTO MEDIA

CLAIM OF PRIORITY

This application is a continuation-in-part of U.S. patent application Ser. No. 10/400,131 filed Mar. 25, 2003 now U.S. Pat. No. 7,052,537 and also claims the benefit of U.S. Provisional Patent Application No. 60/609,402, filed on Sep. 13, 2004, which are incorporated by reference herein in its entirety.

FIELD OF THE INVENTION

The present invention is drawn to ink-jet inks used in printing. More particularly, the present invention is drawn to improved ink-jet inks in which bronzing on print media has been reduced or even eliminated.

BACKGROUND OF THE INVENTION

Bronzing is a lustrous sheen of a printed sample in reflected light which can be associated with certain dyes. Specifically, bronzing refers to a reddish-brown color of the ink upon drying. It is particularly an undesirable property of black inks because of lowered optical densities produced. However, it also can affect other colors such as cyan, producing a reddish tone. Additionally, bronzing is an undesirable print characteristic which can prevent color attributes from being measured.

One solution proposed to eliminate or reduce bronzing has been to raise the pH of the ink. However, it has been found that raising the pH of an ink can cause materials degradation of printheads that are used to jet the ink. Thus, an alternative means of reducing or even eliminating bronzing of ink-jet inks printed on print media would be an advancement in the art.

SUMMARY OF THE INVENTION

It has been recognized that certain additives can be added to ink-jet inks to reduce bronzing on photographic media, such as specialty fast-drying ink-jet photographic porous media or specialty slower-drying ink-jet photographic swellable media. In accordance with this recognition, an ink-jet printing system can comprise a print medium having an ink-receiving layer, and an ink-jet ink configured for printing on the ink-receiving layer. The ink-jet ink can comprise a liquid vehicle, a dye, and an anti-bronzing agent. The anti-bronzing agent can include one or more of a planar aliphatic ring structure or a planar aromatic ring structure, such as a derivatized cyclic aliphatic ring, a sulfonated aromatic ring, a halogenated aromatic ring, a phenol ring, a heterocyclic aromatic ring, a fused aromatic-aliphatic ring system, or derivative thereof. The anti-bronzing agent can be present in the ink-jet ink at an effective concentration to reduce bronzing of the ink-jet ink printed on the ink-receiving layer.

In another embodiment, a method of reducing bronzing of an ink-jet ink printed on a print medium can comprise the step of jetting the ink-jet ink onto the print medium, wherein the print medium includes an ink-receiving layer. The ink-jet ink can comprise a liquid vehicle, a dye, and an anti-bronzing agent present in an effective concentration to reduce bronzing of the ink-jet ink printed on the ink-receiving layer. The anti-bronzing agent can include one or more of a derivatized planar aliphatic ring structure or a planar aromatic ring structure, such as a derivatized cyclic aliphatic ring, a sulfonated aromatic ring, a halogenated aromatic ring, a phenol ring, a heterocyclic aromatic ring, a fused aromatic-aliphatic ring system, or derivative thereof.

Additional features and advantages of the invention will be apparent from the detailed description which follows, taken in conjunction with the accompanying drawings, which together illustrate, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a dye" includes reference to one or more of such materials.

As used herein, "liquid vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as polymers, UV curable materials, plasticizers, and/or co-solvents in some embodiments.

The term "anti-bronzing agent" herein includes compositions that are added to ink-jet inks to prevent or reduce the level of bronzing when the ink is printed on a print medium. In a general embodiment, the anti-bronzing agent can be an anti-bronzing agent that includes a planar aliphatic ring structure or a planar aromatic ring structure. The anti-bronzing agent can be present in the ink-jet ink at an effective concentration to reduce bronzing of the ink-jet ink printed on the ink-receiving layer. The anti-bronzing additive(s) of the present invention, when added at appropriate concentrations, can act to stabilize dyes that are prone to bronzing. The act of promoting stability of these dyes when printed on ink-receiving layers of print media can reduce bronzing. With respect to levels of bronzing reduction, the teachings herein permit reduction of bronzing to acceptable levels or even elimination of bronzing of ink-jet inks printed on print media. Advantages of the teachings herein over other approaches, such as increasing the pH of the ink, include that pH-sensitive materials in the printhead are not jeopardized, and that there is a relatively wide range of compounds that can be utilized in practice of the embodiments.

The term "planar" when referring to an anti-bronzing agent indicates that the general configuration of the molecule is along a single geometric plane. Core atoms of five- and six-membered aromatic rings, as well as five-membered aliphatic rings, fused multi-ringed aliphatics or aromatics, as well as combination aliphatic-aromatics ring systems, e.g., benzoquinones, naphthaquinones, and anthraquinones, are typically considered planar in geometric relation to one another.

Examples of planar compositions that can be used in accordance with embodiments of the present invention include planar aliphatic ring structures or planar aromatic ring structures, such as derivatized cyclic aliphatic rings, sulfonated aromatic rings, halogenated aromatic rings, phenol rings, heterocyclic aromatic rings, or derivatives thereof. Planar compositions can include groups attached to the planar aromatic or aliphatic core atoms, and such compositions are still considered to be planar.

When referring to a "planar aliphatic ring" or a "planar aromatic ring," such as a derivatized cyclic aliphatic ring, a sulfonated aromatic ring, a halogenated aromatic ring, a phenol ring, a heterocyclic aromatic ring, a fused aromatic-aliphatic ring system, or a derivative thereof, it is understood that the term "ring" can include a single ring structure or a fused ring system of multiple rings. The single ring structure or the fused ring system can either be in a derivatized or non-derivatized condition unless specifically denoted as derivatized either specifically or generally, e.g., halogenated, sulfonated, derivatized, etc. In other words, the term "ring" does not limit a specific composition to a single ring, as often multiple fused rings are considered to be ring structures in accordance with embodiments of the present invention.

"Derivatized" or "derivative(s)" in the context of the present application refers to pendent groups that can be attached to the planar aliphatic or planar aromatic ring structures of the present invention. Some of the planar aliphatic or planar aromatic ring structures are described generally as derivatized, e.g., a derivatized cyclic aliphatic ring; others are described as specifically derivatized, e.g., a sulfonated aromatic ring or a halogenated aromatic ring; and still others are described as not being derivatized, e.g., a phenol ring, a heterocyclic aromatic ring, or a fused aromatic-aliphatic ring system. Each of these compositions can be derivatized (or further derivatized). In other words, whether these compositions are described as specifically or generally derivatized to begin with, or are described as not being initially derivatized, each of these compositions can be derivatized or further derivatized in accordance with embodiments of the present invention. This being stated, the term derivatized or derivative(s), regardless of the context the term is used, includes appending a chemical group(s) to the planar aliphatic or aromatic ring. Such groups can include $C_1$ to $C_6$ alkyl, ether, alcohol, carboxylate, aldehyde, ester, halogen, amine, amide, ketone, aryl, sulfonamide, sulfonic acid, and combinations thereof.

The term "about" when referring to a numerical value or range is intended to encompass the values resulting from experimental error that can occur when taking measurements.

As used herein, "effective amount" or "effective concentration" refers to at least the minimal amount of a substance or agent, which is sufficient to achieve a desired effect. For example, an effective amount of a "liquid vehicle" is at least the minimum amount required in order to create an ink composition, while maintaining properties necessary for effective ink-jetting.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In accordance with the present invention, an ink-jet printing system can comprise a print medium having an ink-receiving layer, and an ink-jet ink configured for printing on the ink-receiving layer. The ink-jet ink can comprise a liquid vehicle, a dye, and an anti-bronzing agent. The anti-bronzing agent can be one or more of a planar aliphatic ring structure or a planar aromatic ring structure, such as a derivatized cyclic aliphatic ring, a sulfonated aromatic ring, a halogenated aromatic ring, a phenol ring, a heterocyclic aromatic ring, a fused aromatic-aliphatic ring system, or derivatives thereof. The anti-bronzing agent can be present in the ink-jet ink at an effective concentration to reduce bronzing of the ink-jet ink printed on the ink-receiving layer.

In another embodiment, a method of reducing bronzing of an ink-jet ink printed on a print medium can comprise the step of jetting the ink-jet ink onto the print medium, wherein the print medium includes an ink-receiving layer. The ink-jet ink can comprise a liquid vehicle, a dye, and an anti-bronzing agent present in an effective concentration to reduce bronzing of the ink-jet ink printed on the ink-receiving layer. The anti-bronzing agent can include a planar aliphatic ring structure or a planar aromatic ring structure, such as a derivatized cyclic aliphatic ring, a sulfonated aromatic ring, a halogenated aromatic ring, a phenol ring, a heterocyclic aromatic ring, a fused aromatic-aliphatic ring system, or derivatives thereof.

In each of the above embodiments, the effective concentration of the anti-bronzing agent(s) can be an amount that improves stability of the dye when the ink-jet ink is printed on the ink-receiving layer, as it is typically dye destabilization that causes bronzing on various types of photo media. To determine whether bronzing is reduced, one can compare bronzing of an anti-bronzing agent-containing ink-jet ink printed on a media substrate to an ink-jet ink that does not include the anti-bronzing agent printed on the same media type. This being stated, the addition of too much anti-bronzing agent can also act to destabilize a dye when printed on print media. The concentration range that can be used to reduce bronzing is, to some degree, case specific. Thus, when determining how much of the anti-bronzing agent to add to an ink-jet ink, several considerations can be made, such as the type and amount of dye present, the type of anti-bronzing agent to be added, and the type and amount of liquid vehicle components present. Determining how much anti-bronzing agent to add would be easily ascertainable to one skilled in the art after considering the present disclosure. As a general rule, concentrations within the range of 0.2 wt % to 30 wt % of anti-bronzing agent can provide acceptable results, as determined on a case by case basis.

Of the classes of additives specifically disclosed, there are many compositions within each class that can be used. For example, if the anti-bronzing agent is a derivatized cyclic aliphatic composition, any of a number of derivatized five-membered heterocyclic aliphatic ring compositions can be used, such as derivatized 2-pyrrolidinones, including 1-(2-hydroxyethyl)-2-pyrrolidinone or N-butyl-2-pyrrolidinone. Alternatively, five-membered homocyclic aliphatic ring compositions can be used as well, such as deprotonated 2-acetylcyclopentanone, which is a carbon acid that is planar when deprotonated. In another embodiment, derivatized or non-derivatized phenols can also be used. If the anti-bronzing agent is a sulfonated aromatic ring composition, then 2-naphthalenesulfonic acid, 1-naphthol-3,6-disulfonic acid, or 4,5-dihydroxy-1,3-benzenedisulfonic acid can be used. As described with respect to ring structures in general, the sulfonated aromatic ring can be a single ring structure of a fused ring system. The ring structure can be sulfonated by a sulfonic acid group or a sulfonamide group, for example. Exemplary groups that can be used include —SO$_3$H, —SO$_2$NH$_2$, —SO$_2$NHCH$_2$CH$_3$, or —SO$_2$NH(CH$_2$CH$_3$)$_2$. Exemplary halogenated aromatic compositions that can be used include brominated or chlorinated halophenols, such as 1,2-chlorophenol, 1,2-bromophenol, 1,4-chlorophenol, or 1,4-bromophenol. These same chlorinated halophenols are also examples of derivatized phenols that can be used. Examples of heterocyclic aromatic compositions that can be used include pyridine-N-oxide, 3-pyridylcarbinol, guanine, pyrazine, or 2,6-lutidine. In another embodiment, when the planar anti-bronzing agent is the fused aromatic-aliphatic ring system, an exemplary composition that can be used is an anthraquinone, such as anthraquinone-2-sulfonate.

In further detail with respect to the additive, it can typically be an anti-bronzing agent that is either anionic or neutral in the ink-jet ink, though this is not a required feature of the present invention. Examples of anionic planar anti-bronzing agents include 2-chlorophenol, 2-bromophenol, phenol, 2-acetylcyclopentanone, or the like. Examples of neutral planar anti-bronzing agents include guanine, pyrazine, 2,6-lutidine, 4-chlorophenol, 4-bromophenol, pyridine-N-oxide, 2-pyrrolidinone, imidazo-[1,2a]-pyridine, or the like. The state of protonation is dependent on the pH of the ink compared to the pKa of the additive. Thus, the above groupings are not intended to be limiting, but merely have been found to be functional with various ink-jet inks at more neutral to slightly basic ink-jet inks. For example, 2-acetylcyclopentanone, which is a carbon acid, is planar when deprotonated, and non-planar when protonated. This composition provides acceptable anti-bronzing properties when in the deprotonated configuration; however, when it is in a non-planar protonated configuration, it does not typically work as well for anti-bronzing purposes.

Aside from the anti-bronzing agent, the balance of the ink-jet ink can include conventional co-solvents (organic and aqueous) and at least one dye in the conventional ranges disclosed elsewhere; see, e.g., U.S. Pat. No. 6,177,485, the contents of which are incorporated herein by reference, for a list of suitable co-solvents and dyes and concentration ranges thereof for ink-jet inks. It will be appreciated that not all dyes result in bronzing on the coated print media discussed herein. However, where any such dye used in ink-jet printing is found to bronze, the present teachings provide an approach to eliminating such bronzing.

More specifically with respect to the liquid vehicle, the ink-jet ink compositions of the present invention are typically prepared in an aqueous formulation or liquid vehicle which can include water, cosolvents, surfactants, buffering agents, biocides, sequestering agents, viscosity modifiers, humectants, and/or other known additives. In one aspect of the present invention, the liquid vehicle can comprise from about 70 wt % to about 99.9 wt % by weight of the ink-jet ink composition. In another aspect, other than the colorant, liquid vehicle can also carry polymeric binders, latex particulates, and/or other solids.

As described, cosolvents can be included in the ink-jet compositions of the present invention. Suitable cosolvents for use in the present invention include water soluble organic cosolvents, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol)alkyl ethers, higher homologs of poly(propylene glycol)alkyl ethers, lactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. Cosolvents can be added to reduce the rate of evaporation of water in the ink-jet to minimize clogging or other properties of the ink such as viscosity, pH, surface tension, optical density, and print quality. The cosolvent concentration can range from about 0.01 wt % to about 40 wt %, and in one embodiment is from about 5 wt % to about 15 wt %. Multiple cosolvents can also be used, as is known in the art.

Various buffering agents or pH adjusting agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the bleed control or optical density characteristics of the present invention. If used, buffering agents typically comprise less than about 10 wt % of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.1 wt % to about 0.25 wt %.

One or more of various surfactants can also be used as are known by those skilled in the art of ink formulation. Non-limiting examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, commercial products such as TERGITOLS, SURFYNOLS, ZONYLS, TRITONS, MERPOLS, and combinations thereof. The amount of surfactant added to the ink-jet inks of this invention can range from 0 wt % to 10 wt %.

In one embodiment of the present invention, the ink-jet ink can be configured for application from a thermal ink-jet pen. Thermal ink-jet systems are quite different in their jetting properties than piezo ink-jet systems. As such, compositions that are effective for use in piezo ink-jet systems are not necessarily effective for use with thermal ink-jet ink systems.

However, the converse is not necessarily true. In other words, polymers that work well with thermal ink-jet systems are more likely to work with piezo systems than vice versa. Therefore, the selection of liquid vehicle or other additives for use with thermal ink-jet systems often requires more care, as thermal ink-jet systems are less forgiving than piezo ink-jet systems.

Examples of dyes benefiting from the teachings herein include, but are not limited to, Direct Blue 199 (CI 74180), Black 287 (Projet Fast Black 2), as well as other dyes described generally in U.S. Pat. No. 5,062,893, to name a few. It is to be emphasized that the concentration of components in the ink is to be made on a case by case basis. More specifically, the concentration and selection of the type of the anti-bronzing agent can depend on identity of dye, concentration of dye, the pKa of the dye, the vehicle components present, the pH of the ink, the pH of the media, or the type of media, etc. Further, it is to be noted that the inclusion of either too high or too low of a concentration of an anti-bronzing agent can lead to dye destabilization, and thus, concentrations can be determined on a case by case basis.

The ink-jet inks of the present invention are particularly useful when printing of so-called "photo media," such as media having an ink-receiving layer coated thereon. When referring to the ink-receiving layer of a print medium, this can include any coating that is used to accept an ink-jet ink to produce an image. There are at least two types of ink-receiving layers that can be used, including metal oxide or semi-metal oxide particulate-based ink-receiving layers, e.g., alumina- or silica-based, and polymeric swellable ink-receiving layers, e.g., gelatin or polyvinyl alcohol. The media substrate, for example, can be paper, plastic, coated paper, fabric, art paper, or other known substrate used in the ink-jet printing arts. In one embodiment, photobase can be used as the substrate. Photobase is typically a three-layered system comprising a single layer of paper sandwiched by two polymeric layers, such as polyethylene layers.

With respect to the ink-receiving layer, if a semi-metal oxide or metal oxide particulate-based ink-receiving layer is used; inorganic semi-metal or metal oxide particulates, a polymeric binder, and optionally, mordants and/or other porous coating composition agents can be present. In one embodiment, the inorganic semi-metal or metal oxide particulates can be silica, alumina, boehmite, silicates (such as aluminum silicate, magnesium silicate, and the like), titania, zirconia, calcium carbonate, clays, and combinations thereof. In a more detailed aspect, the particulates can be alumina, silica, or aluminosilicate. Each of these inorganic particulates can be dispersed throughout a porous coating composition, which can be applied to a media substrate to form the porous ink-receiving layer. The semi-metal oxide or metal oxide particulates can be chemically surface-modified using silane coupling agents having functional moieties attached thereto.

Turning to the organic swellable ink-receiving layer that can be coated on the media substrate, hydrophilic compositions such as gelatin, polyvinyl alcohol, methyl cellulose, or the like can be applied. These compositions are polymeric in nature, and when an ink-jet ink is printed thereon, the polymeric coating that makes up the ink-receiving layer absorbs and traps the ink. These hydrophilic polymeric materials can be coated on a single side of a media substrate, or can be coated on both sides of a media substrate to provide a good printing surface for ink-jet ink applications, as well as to provide balance to the back of the substrate, preventing substrate curl that may occur with a paper substrate. Backcoats can also be applied to the media to prevent ink-transfer when stacking media after printing. An example of such media is described in U.S. Pat. No. 6,638,585, which is incorporated herein by reference.

The ink-receiving layer, whether primarily inorganic porous or organic swellable, can be a single layer or a multi-layer coating designed to adsorb or absorb sufficient quantities of ink to produce high quality printed images. The coating composition may be applied to the media substrate to form the ink-receiving layer by any means known to one skilled in the art, including blade coating, air knife coating, rod coating, wire rod coating, roll coating, slot coating, slide hopper coating, gravure, curtain, and cascade coating. The ink-receiving layer can be printed on one or both sides of the media substrate.

The following example illustrates embodiments of the invention that are presently best known. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following example provides further detail in connection with what is presently deemed to be the most practical and preferred embodiment of the invention.

EXAMPLES

Two typical ink-jet ink compositions were prepared, one including Black 287 (Projet Fast Black 2) (Ink 1) and the other containing DB199Na (CI 74180) (Ink 2). The ink containing the DB199Na was divided into fifteen volumes, and the ink containing the Black 287 was divided into four volumes for a total of nineteen ink-jet ink volumes; fifteen including DB199Na (Inks 1-15) and four including Black 287 (Inks 16-19). Inks 1 and 16 were not further modified, providing a baseline or control for determining bronzing improvement for the other inks. Inks 2-15 and 17-19 were each modified with a planar anti-bronzing agent in accordance with embodiments of the present invention, as shown in Tables 1 and 2 below. All of the ink-jet inks prepared were adjusted to a pH of about 8 to 8.5. The print media used for the study were 1) an experimental photopaper comprising a photobase substrate and a silica-based ink-receiving layer having a pH of about 4 coated thereon (referred to as "porous media") and 2) a polyvinyl alcohol coated swellable media having a pH of about 6, which is sold commercially as HP Premium Plus Photo Paper, Glossy (referred to as "swellable media"). With respect to the porous media, silica coatings on print media are disclosed in U.S. Pat. Nos. 5,275,867; 5,463,178; 5,576,088; 5,605,750; 5,989,378; and 6,187,430, the contents of which are incorporated herein by reference. Both of these print media types are used in color ink-jet printing to provide the equivalent of photographic prints.

TABLE 1

Bronzing for DB199Na dye- and anti-bronzing agent-containing ink-jet inks

| Ink | Additive | Swellable Media: Improvement? | Porous Media: Improvement? |
|---|---|---|---|
| 1 | None | Bronzing baseline | Bronzing baseline |
| 2 | 2-acetylcyclopentanone | Yes | Yes |
| 3 | 2-chlorophenol | Yes | Yes |

TABLE 1-continued

Bronzing for DB199Na dye- and anti-bronzing agent-containing ink-jet inks

| Ink | Additive | Swellable Media: Improvement? | Porous Media: Improvement? |
|---|---|---|---|
| 4 | 2-bromophenol | Yes | Yes |
| 5 | phenol | Yes | Yes |
| 6 | guanine | Yes | Yes |
| 7 | pyrazine | Yes | Yes |
| 8 | 2,6-lutidine | Yes | Yes |
| 9 | pyridine-N-oxide | Yes | Yes |
| 10 | 3-pyridylcarbinol | Yes | Yes |
| 11 | 1-(2-hydroxyethyl)-2-pyrrolidinone | Yes | Yes |
| 12 | N-butyl-2-pyrrolidinone | Yes | Yes |
| 13 | 2-naphthalenesulfonic acid | No | Yes |
| 14 | 1-naphthol-3,6-disulfonic acid | No | Yes |
| 15 | 4,5-dihydroxy-1,3-benzenedisulfonic acid | Yes | Yes |

TABLE 2

Bronzing for Black 287 dye- and anti-bronzing agent-containing ink-jet inks

| Ink | Additive | Swellable Media: Improvement? | Porous Media: Improvement? |
|---|---|---|---|
| 16 | None | Bronzing control | Bronzing control |
| 17 | 2-acetylcyclopentanone | Yes | Yes |
| 18 | 2-chlorophenol | Yes | Yes |
| 19 | 3-pyridylcarbinol | No | Yes |

As can be seen by Tables 1 and 2, the inclusion of the specific types of planar anti-bronzing agents as additives in ink-jet inks in accordance with embodiments of the present invention improved bronzing with both types of dye-based ink when printed on porous media. Further, most of the anti-bronzing agents showed improvement in both inks were printed on higher pH swellable media as well. In a small minority of cases when printing on swellable media, certain specific anti-bronzing agents did not perform as well as these same compositions on porous media. However, for the most part, the anti-bronzing agents tested worked well on both types of media.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. An ink-jet printing system, comprising:
   a) a print medium having an ink-receiving layer; and
   b) an ink-jet ink configured for printing on the ink-receiving layer, said ink-jet ink comprising:
      i) a liquid vehicle,
      ii) a dye, and
      iii) an anti-bronzing agent comprising a planar heterocyclic aromatic ring or derivatives thereof, said anti-bronzing agent being neutral in the ink-jet ink and being present in an effective concentration to reduce bronzing of the ink-jet ink printed on the ink-receiving layer.

2. A system as in claim 1, wherein the ink-receiving layer includes a metal oxide or semi-metal oxide particulate-based based coating.

3. A system as in claim 2, wherein the metal oxide or semi-metal oxide particulate-based based coating is alumina- or silica-based coating.

4. A system as in claim 1, wherein the ink-receiving layer includes a polymeric swellable coating.

5. A system as in claim 1, wherein the effective concentration improves stability of the dye when the ink-jet ink is printed on the ink-receiving layer.

6. A system as in claim 1, wherein the anti-bronzing agent is present in the ink-jet ink at from about 0.2 wt % to 30 wt %.

7. A method of reducing bronzing of an ink-jet ink printed on a print medium, comprising ink-jetting an ink-jet ink onto a print medium, said print medium including an ink-receiving layer, said ink-jet ink including:
   a) a liquid vehicle,
   b) a dye, and
   c) an anti-bronzing agent comprising a planar heterocyclic aromatic ring or derivatives thereof, said anti-bronzing agent being neutral in the ink-jet ink and being present in an effective concentration to reduce bronzing of the ink-jet ink printed on the ink-receiving layer.

8. A method as in claim 7, wherein the ink-receiving layer includes a metal oxide or semi-metal oxide particulate-based based coating.

9. A method as in claim 8, wherein the metal oxide or semi-metal oxide particulate-based based coating is alumina- or silica-based coating.

10. A method as in claim 7, wherein the ink-receiving layer includes a polymeric swellable coating.

11. A method as in claim 7, wherein the effective concentration improves stability of the dye when the ink-jet ink is printed on the ink-receiving layer.

12. A method as in claim 7, wherein the anti-bronzing agent is present in the ink-jet ink at from about 0.2 wt % to 30 wt %.

* * * * *